(12) United States Patent
Lau et al.

(10) Patent No.: US 6,329,726 B1
(45) Date of Patent: Dec. 11, 2001

(54) PROPORTIONAL DISTRIBUTION OF POWER FROM A PLURALITY OF POWER SOURCES

(75) Inventors: James Leych Lau, Costa Mesa, CA (US); Xiao Ping Jin, Singapore (SG)

(73) Assignee: Broadband Telcom Power, Inc., Santa Ana, CA (US)

( * ) Notice: Subject to any disclaimer, the term of this patent is extended or adjusted under 35 U.S.C. 154(b) by 0 days.

(21) Appl. No.: 09/519,731

(22) Filed: Mar. 3, 2000

(51) Int. Cl.$^7$ ........................................ H02J 1/10
(52) U.S. Cl. ................................. 307/58; 307/55
(58) Field of Search ................. 307/44, 58, 82, 307/55

(56) References Cited

U.S. PATENT DOCUMENTS

| | | | |
|---|---|---|---|
| 4,719,550 | * | 1/1988 | Powell et al. ........................... 307/66 |
| 4,862,059 | * | 8/1989 | Tominaga et al. ...................... 307/66 |
| 5,250,849 | * | 10/1993 | Periou ................................. 307/10.1 |

* cited by examiner

Primary Examiner—Shawn Riley
(74) Attorney, Agent, or Firm—Kam T. Tam

(57) ABSTRACT

A power distributing mechanism includes a regulating circuit disposed between at least two circuit portions. The regulating circuit includes bifilar-wound windings electrically coupled to the circuit portions. In a first embodiment, the two circuit portions withdraw power from two separate power sources. The regulating circuit, in response to power withdrawn from the power sources passing through the circuit portions, proportionally allocates the withdrawn power between the circuit portions. In the second embodiment, the two circuits portions withdraw power from a single power source. The two circuit portions serve as redundant reliability backup to each other. In the event of circuit failure in one of the circuit portions, the regulating circuit in response to the failure proportionally allocates power to the remaining functioning circuit portion.

3 Claims, 8 Drawing Sheets

PROPORTIONAL DISTRIBUTION OF POWER FROM A PLURALITY OF POWER SOURCES

BACKGROUND OF THE INVENTION

1. Field of the Invention

The present invention relates generally to electrical power distribution, and more particularly, to balanced transforming and distributing of electrical power through a plurality of circuits to provide safety and reliability.

2. Description of the Related Art

Electrical power is universally conveyed through power grids in alternating current (AC) form. Transformers are required to either step up or step down the transmitted power for various applications. For example, for common usage through a single electrical outlet, electrical power is transmitted at a voltage level of between 115 V (Volt) and 120 V alternating at a frequency of 60 Hz (Hertz) with a current limit of 16 A (Ampere). The current limit of 16 A per outlet is set by the NFPA (National Fire Protection Association) for safety reasons. To operate appliances or machines which exceed the set limit, power must be withdrawn from a poly-phase system. Installations of poly-phase systems are costly and heretofore have been mostly confined to industrial sites. Accordingly, heavy-duty power usages through single-phase outlets are very often impractical for almost all purposes as explained below.

To operate a heavy-duty load under a single-phase power delivery environment, one possible scheme is to withdraw power from more than one outlets simultaneously. This practice is fraught with danger. FIG. 1 shows such configuration. It should be noted that the scheme shown in FIG. 1 has not been known to have been attempted by others and is presented herein only for purpose of illustration. Suppose a load 2 operates at a power level of 3 KW (Kilo-Watts). Without any three-phase outlet, power may be drawn from single-phase outlets 4 and 6. Further suppose that the outlet 4 or 6 supplies power at a voltage level of 115 V with a current limit of 16 A. Assuming 115 V and 16 A are expressed in root-mean-square values. Thus maximum power that can be withdrawn from either the outlet 4 or 6 is 1.84 KW (115 V×16 A), well below the required 3 KW. To meet the demand, a possible approach is to extract power simultaneously from the two outlets 4 and 6.

Shown in FIG. 1 is an arrangement in which two circuits 5 and 7 withdraw power simultaneously from two separate single-phase outlets 4 and 6. Thereafter, the outputs of the circuits 5 and 7 are merged together to supply power to a single load 2.

To begin with, attention is directed to the first circuit 5, in which a transformer 8 is disposed between the outlet 4 and a rectifier 10. Power is transmitted to the rectifier 10 from the outlet 4 via the transformer 8. After passing through the half-wave rectifier 10, the extracted power is directed to a power factor correction circuit 12. The function of the power correction circuit 12 is to align the supply voltage to be as much in phase with the resultant current as possible such that the supplied power is maximally utilized. Thereafter, the power reaches the intended load 2.

For the second circuit 7 extracting power from the outlet 6, the arrangement is substantially the same as that for the circuit 5 and is thus not further repeated.

The pitfall with the power distributing arrangement as shown in FIG. 1 is that one distributing circuit, which can either be circuit 5 or 7, may withdraw a higher current level in comparison to the other. The skew current distribution may be caused by manufacturing tolerances of components made up of the circuits 5 and 7. Alternatively, the skew current distribution may also be caused by other ambient factors such as temperature variations, or even different physical placements of the circuits with different wiring lengths. When the power exceeds the rated amount for any of the outlets 4 or 6, the circuit breaker or fuse associated with the circuit outlet 5 or 6, if operational, will be tripped or blown. As a consequence, there will be a complete power shutoff from either one of the outlets 4 or 6. Once that occurs, the other circuit 5 or 7 carries the burden of supplying the entire power demand. Since it is assumed that the entire power demand exceeds the rated power limit of each outlet 4 or 6, the protective mechanism of the remaining outlet is triggered into action also resulting in another complete power shutoff to the remaining circuit. Consequently, the operation of the load 2 will be unexpectedly turned off. For the aforementioned reasons, the operation of the load 2 is highly unpredictable and is at the mercy of whether there are matched current flows through the circuits 5 and 7. Accordingly, withdrawing large amount of power from multiple single-phase outlets and simultaneously driving a single load are seldom attempted.

Because of the high costs associated with installation of poly-phase power transmission systems, in most areas, such installations are confined to industrial sites for the purpose of powering heavy-duty machinery. However, there have been increasing demands for high power usages beyond the industrial sites. For instance, technological advances in telecommunications and data networks have progressed rapidly in recent years. Installations of these telecommunications or data networks are very often in office buildings with only single-phase outlets. Powering up such networks require considerable electrical power in which single-phase outlets may not be capable of meeting the rating requirements. Rewiring an existing office building with poly-phase power outlets is an expensive undertaking.

In addition to the problem encountered above, in powering a heavy-duty load, there is also a need to assure high reliability in the powering process. For instance, in the same example as mentioned before in which an extensive piece of telecommunications network equipment needs to be operated, in particular applications, operational reliability is of paramount importance. For example, the equipment may transact instantaneous on-line financial data and any failure, such as power related failure, may cause disastrous consequences. Without expensive alteration to existent power outlets, there has been a long-felt need to provide solutions to tackle the aforementioned problems.

SUMMARY OF THE INVENTION

It is accordingly the object of the invention to provide a power distributing mechanism capable of high wattage power delivery not with costly alteration or installation but with simple circuit implementation. It is another object of the invention to provide such power distributing mechanism capable of powering heavy-duty usages without disturbing the existent power transmission grids. It is yet another object of the invention to provide such power distributing mechanism capable of operating with high reliability.

The power distributing mechanism in accordance with the invention accomplishes the above objectives by providing a power distributing circuit with at least two circuit portions. In one embodiment, the circuit portions withdraw power from separate power sources. Disposed between the circuit portions is a regulating circuit, which comprises bifilar-wound windings electrically coupled to the circuit portions. The regulating circuit, in response to power withdrawn from the power sources and passing through the circuit portions, proportionally allocates power through the circuit portions. As a consequence, currents passing through the circuit portions are always balanced, with no fear of one circuit portion operating in excess of current over the other.

In another embodiment, the two circuits portions withdraw power from a single power source. The two circuit portions serves as redundant reliability backup to each other. In the event of circuit failure in one of the circuit portions, the regulating circuit in response to the failure proportionally allocates power to the remaining functioning circuit portion.

These and other features and advantages of the invention will be apparent to those skilled in the art from the following detailed description, taken together with the accompanying drawings, in which like reference numerals refer to like parts.

DETAILED DESCRIPTION OF THE INVENTION

Figure 1:
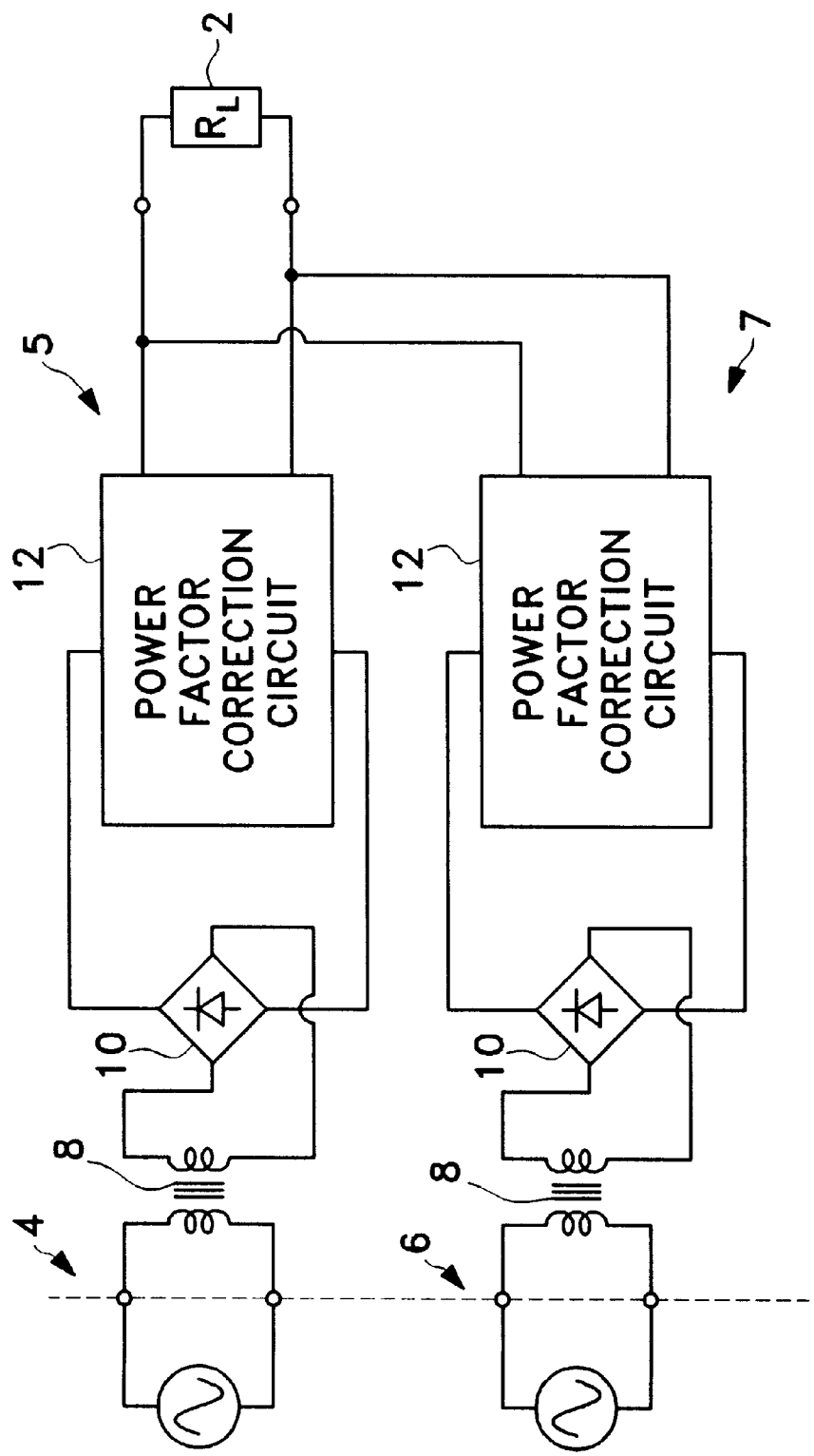
FIG. 1 is a schematic drawing of a possible but ineffective arrangement of extracting power from multiple single-phase power outlets.
Figure 2:
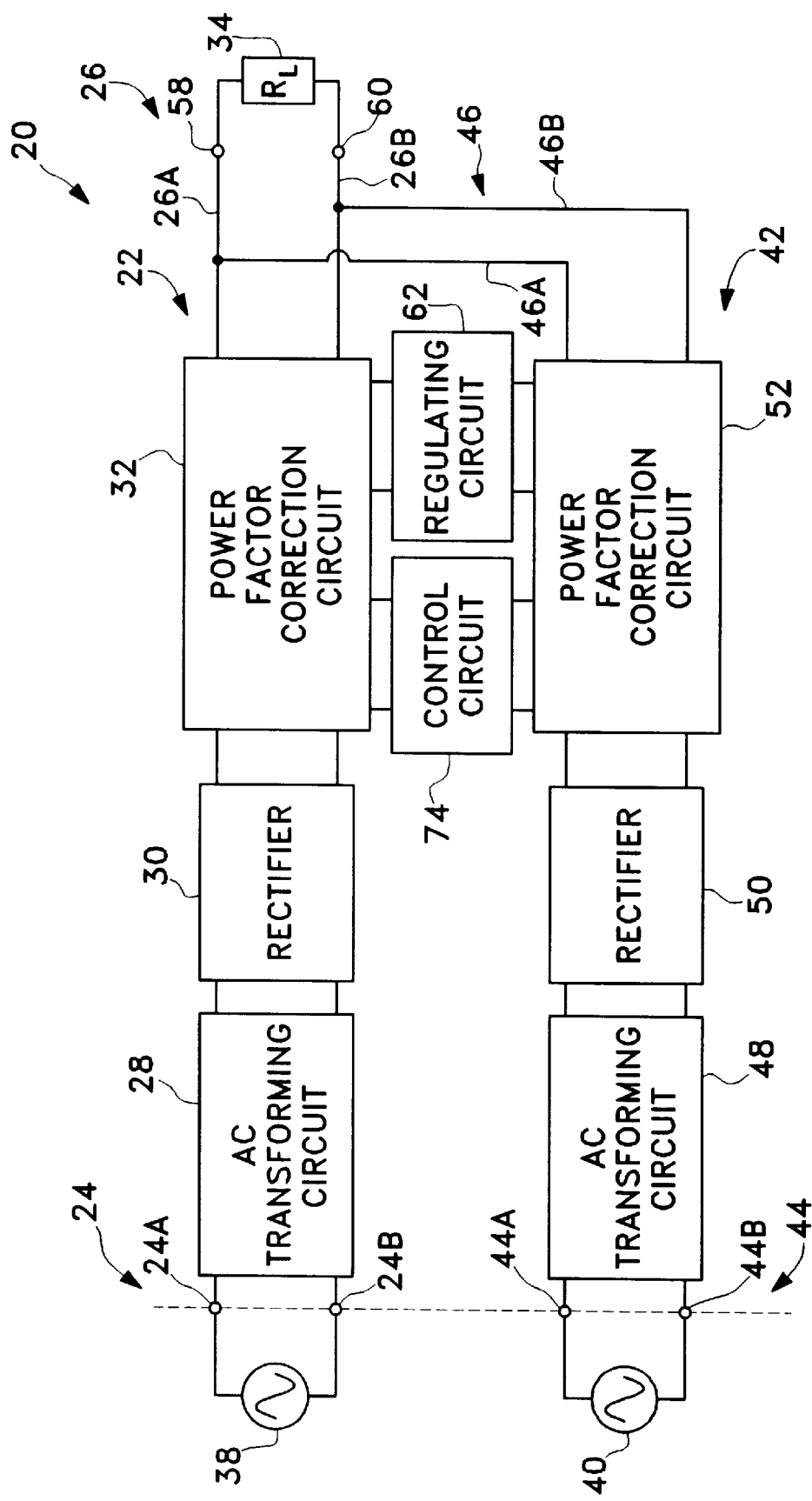
FIG. 2 is a schematic drawing showing the general architecture of a first embodiment of the invention.

Reference is now directed to FIG. 2 which is a schematic drawing showing the overall architecture of the power distributing circuit of the first embodiment of the invention and is signified by the reference numeral 20. The power distributing circuit 20 can be approximately partitioned into a first circuit 22 and a second circuit 42.

The first circuit 22 withdraws power from a first outlet 38 and includes an input 24 which comprises input terminals 24A and 24B. The first circuit 22 also has an outlet 26 comprising output terminals 26A and 26B. The input 24 is connected to a AC transforming circuit 28. The output of the transforming circuit 28 feeds into a rectifier 30 which is also electrically linked to a power factor correction circuit 32. The output of the power factor correction circuit 32 is electrically tied to a load 34.

In a similar manner, the second circuit 42 extracts power from a second outlet 40. The second circuit 42 also has an input 44 and an output 46. The second circuit 42 also includes an AC transforming circuit 48, a rectifier 50, and a power factor correction circuit 52 electrically connected together substantially similar to the corresponding connections of the first circuit 22 and is thus not further elaborated. However, the outputs 26 and 46 of the respective first and second circuits 22 and 42 are connected to the same load 34. That is, the output terminal 26A of the first circuit 22 is tied to the output terminal 46A of the second circuit 42 and the connection is electrically coupled to the first terminal 58 of the load 34. In a similar manner, the output terminal 26B of the first circuit 22 is tied to the output terminal 46B of the second circuit 42 and the connection is electrically coupled to the second terminal 60 of the load 34.

There is a regulating circuit 62 sandwiched between the first and second power factor correction circuits 32 and 52. The regulating circuit 62 serves the important role of proportionally allocating current through the first and second circuits 22 and 42.

Furthermore, there is also a control circuit 74 disposed between the first and second power factor correction circuits 32 and 52. The operations of the regulating circuit 62 and the control circuit 74 will be described later.

Figure 3:
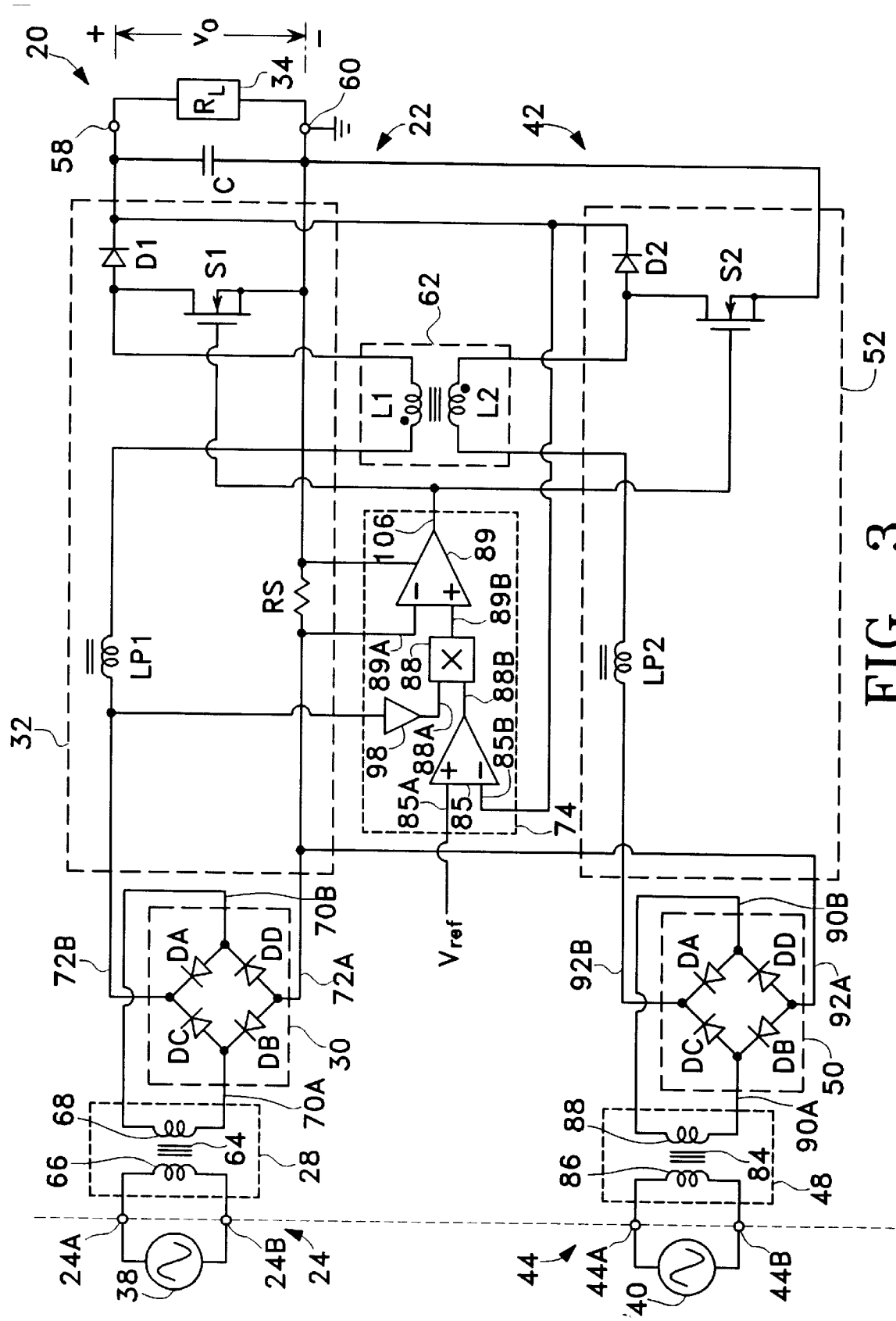
FIG. 3 is a schematic drawing highlighting the key circuits of the first embodiment of the invention.

Shown in FIG. 3 is a more detailed schematic of the power distributing circuit 20 of the first embodiment. Again, for ease of illustration, attention is first directed to the first circuit 22.

In the first circuit 22, the AC transforming circuit 28 includes an AC transformer 64 having a primary winding 66 and a secondary winding 68. The primary winding 66 is connected to the input 24 which, in this embodiment, draws power from the single-phase power outlet 38. The secondary winding 68 is connected to the rectifier 30. In this embodiment, the rectifier 30 is a Wheatstone bridge rectifier comprising 4 diodes DA–DD. The cathode of the diode DB is connected to the anode of the diode DC and the connection in turn is tied to one of the input terminals 70A of the rectifier 30. In a similar manner, the cathode of the diode DD is tied to the anode of the diode DA and forms the other input terminal 70B of the rectifier 30. Similarly, the first output terminal 70A of the rectifier 30 is formed by attaching the anodes of the diodes DB and DD together; and the second output terminal 70B of the rectifier 30 is formed by linking the cathodes of the diodes DA and DC together.

The power factor correction circuit 32 in this embodiment comprises an inductor LP1 and a capacitor C. The inductor LP1 is connected to the capacitor C through the regulating circuit 62 and a first diode D1. There is also a switch S1 directly coupled across the capacitor C. In this embodiment, the switch S1 is a FET (Field-Effect Transistor) and is tied to and controlled by a pulse width modulation (PWM) control circuit 74. The switch S1 basically admits stored charges in the inductor LP1 into the capacitor C controllably in a manner that a high power factor can be achieved. The operation of the switch S1 will also be later explained.

Likewise, in the second circuit 42, the AC transforming circuit 48 includes a transformer 84. The rectifier 50 is also a Wheatstone bridge rectifier. The power factor correction circuit 52 also includes an inductor LP2, a switch S2 and shares the capacitor C with the first circuit 22. The electrical connections of the second circuit 42 are substantially similar to the corresponding connections of the first circuit 22 and are not further elaborated. However, it should be noted that in the power distributing circuit 20, the first power factor correction circuit 32 and the second power factor correction circuit 52 commonly share the PWM control circuit 74, as shown in FIGS. 2 and 3.

Prior to the description of the operation of the power distributing circuit 20, the structure and function of the regulating circuit 62 need first be explained. Afterward, for ease of illustration and understanding, the principle of operation of the invention will first be explained based on a simplified version of the circuit 20. Thereafter, the entire operation of the circuit 20 will be described.

Figure 4:
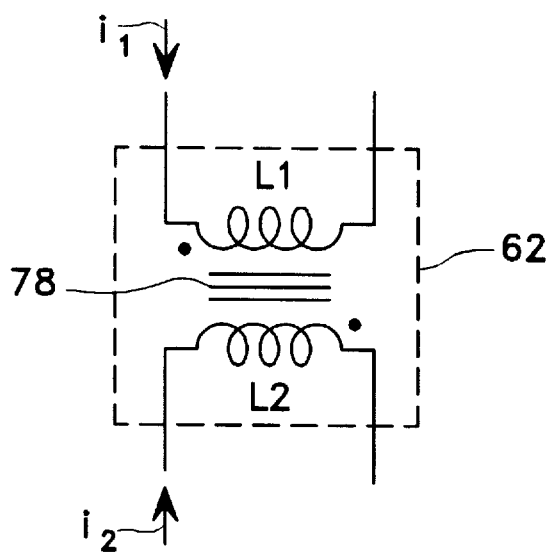
FIG. 4 is a schematic drawing of a regulating circuit with bifilar-wound windings.
Figure 5:
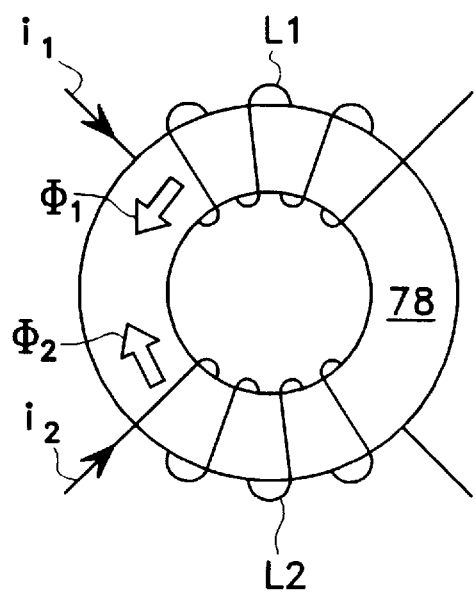
FIG. 5 is a schematic drawing of the regulating circuit shown with a core illustrating the relationship between the winding currents and the resultant fluxes generated.

Reference is now directed to FIG. 4 in which the regulating circuit 62 is shown as isolated from the other circuits. The regulating circuit 62 includes a first winding L1 and a second winding L2. The windings L1 and L2 are bifilar-wound with respect to each other. FIG. 5 shows schematically the physical winding orientation of the two windings L1 and L2. The two windings L1 and L2 are shown as wound around a core 78. Suppose the winding L1 carries a current $i_1$. In this specification, the lower case alphabets are used to designate parameters that vary with time. Under Ampere's law, a flux $\phi_1$ is induced by virtue of the flow of the current $i_1$ through the winding L1. Likewise, suppose the winding L2 conducts a current $i_2$ and similarly generates another flux $\phi_2$. In a bifilar winding configuration, the generated fluxes $\phi_1$ and $\phi_2$ by the respective currents $i_1$ and $i_2$ are substantially opposite to each other in orientation, as shown in FIG. 5.

Figure 6:
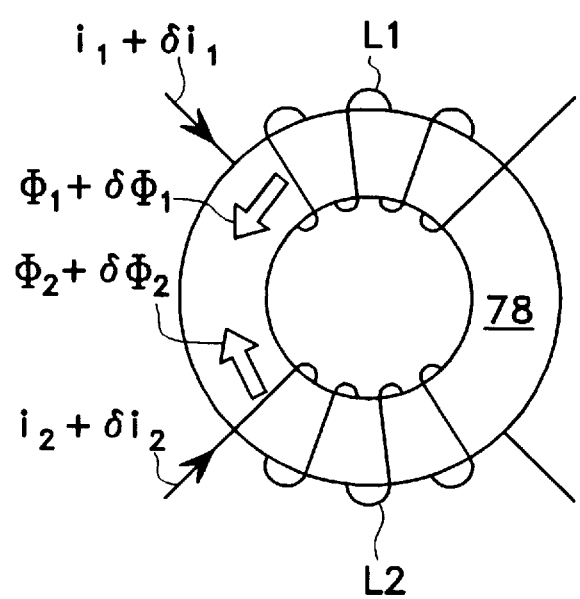
FIG. 6 is a schematic drawing of the regulating circuit shown in FIG. 5 illustrating the effect of incremental change in current in one of the winding affects the current in the other winding.

Suppose there is an incremental increase in the first current $i_1$ in the amount of $\delta i_1$. Change of current through the winding L1 which is an inductor induces a corresponding change in the first flux $\phi_1$ as $\delta \phi_1$. The increase in flux 67 $\phi_1$ flows through not only the first inductor L1 but also the second inductor L2 along the core 78. According to Lenz's law, an inductor always develops an equal and opposite flux in response to any change in flux forcing through the inductor. Thus, the inductor L2 develops an equal and opposite amount of incremental flux $\delta \phi_2$ in opposition to the sudden change in the flux $\delta \phi_1$ thrusting through the winding L2. Because of the incremental flux $\delta \phi_2$, under Faraday's law, a current is consequently induced in the winding L2 as an incremental current $\delta I_2$ added to the original current $I_2$. As an overall result, any change in current in one winding automatically proportionally mirrors another change in current in another winding. These cause and effect events constitute an automatic regulating feedback mechanism, and are fully utilized by the power distributing circuit 20 in accordance with the invention. The result of the automatic regulating mechanism is schematically shown in FIG. 6.

Figure 7:
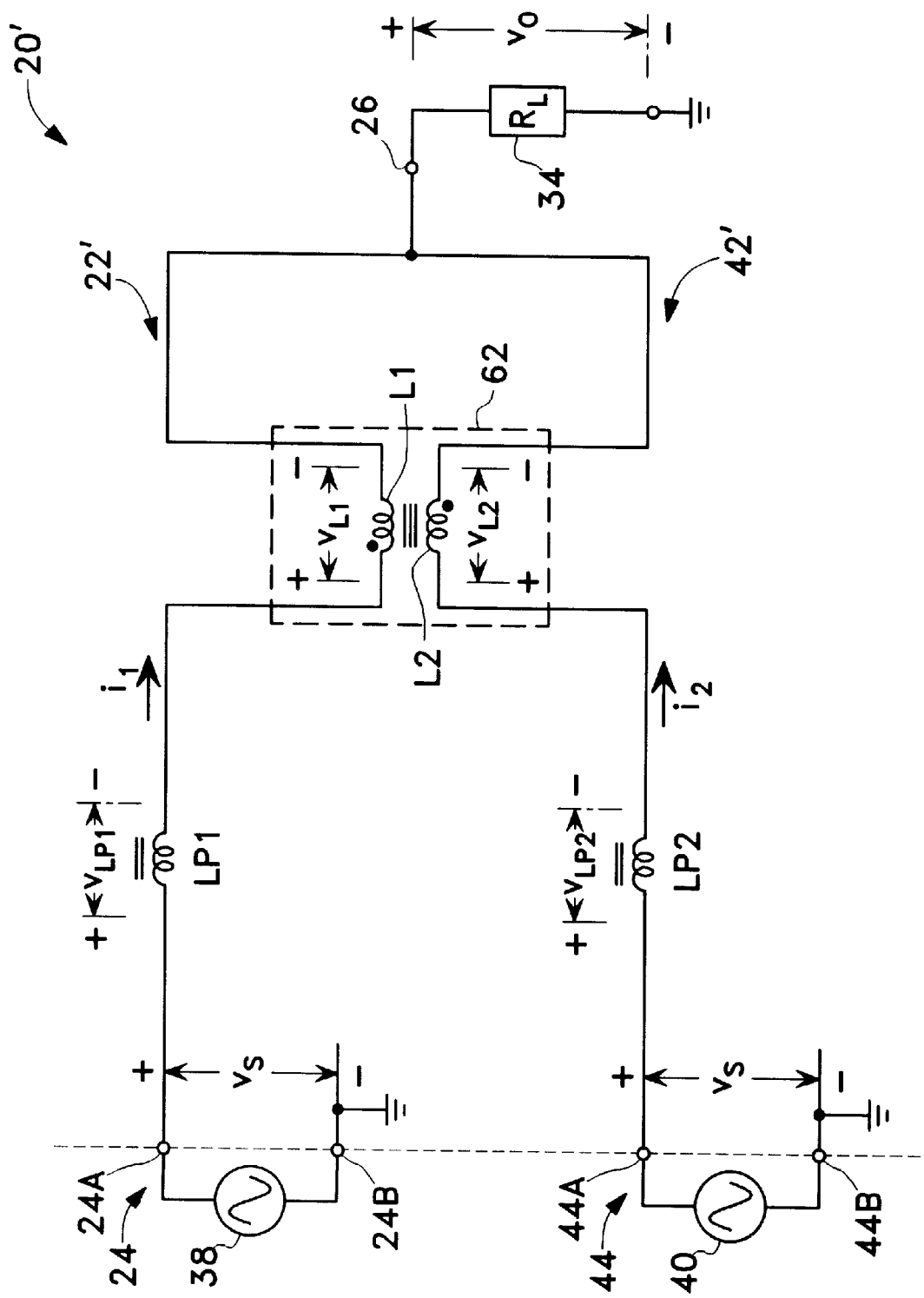
FIG. 7 is a simplified version of the power distributing circuit in accordance with the invention for the purpose of explaining the current balancing mechanism of the regulating circuit.

The regulating mechanism explained above is based on electromagnetic theory, the mechanism can also be explained by circuit theory. For ease of illustration, FIG. 7 schematically shows the stripped down version of the power distributing circuit 20 and is signified by the reference 20'. In particular, circuits such as the AC transforming circuits 28 and 48, the rectifiers 30 and 50, the power factor correction circuits 32 and 52 are all taken away resulting in the skeleton circuit 20' as shown in FIG. 7. The simplified versions of the circuits 22 and 42 are also denoted respectively as 22' and 42'. As shown in FIG. 7, the circuits 22' and 42' withdraw power from the outlets 38 and 40, respectively. The circuits 22' and 42' are coupled together through the regulating circuit 62.

Suppose that each of the outlets 38 and 40 supplies in-phase voltages $v_s$ with equal amplitudes. Under Kirchhoff's law, for the first circuit 22':

$$v_s = v_{LP1} + v_{L1} + v_o \tag{1}$$

where $v_{LP1}$ and $v_{L1}$ are the respective voltage drops across the inductor LP1 and the first winding L1 in Volts, and $v_o$ is the voltage across the load 34.

Similarly, for the circuit 42':

$$v_s = v_{LP2} + v_{L2} + v_O \tag{2}$$

where $v_{LP2}$ and $v_{L2}$ are the respective voltage drops across the inductor LP2 and the second winding L2 in Volts, and $v_O$ is defined as above.

However, from basic circuit theory, voltage across the first or second inductor LP1 or LP2 can be expressed by the following expression:

$$v_{LP} = L \frac{di}{dt} \tag{3}$$

where $v_{LP}$ is the voltage developed across either the inductors LP1 or LP2, L is the corresponding inductance of either inductor LP1 or LP2 expressed in H (Henries) and di/dt is the rate of change of current with respect to time, expressed in A/s (Amperes/second).

Voltage across the first or second winding L1 or L2 of the regulating circuit 62 can be represented by the following mathematical formula:

$$v_L = L \frac{di}{dt} - M \frac{di'}{dt} \tag{4}$$

where $v_L$ is the voltage developed across either the winding L1 or L2 of the regulating circuit 62; L is the self inductance of either winding L1 or L2; M is the mutual inductance of the bifilar-wound winding L1 and L2; i is the current passing through either the winding L1 or L2 and i' is the current passing through the other winding. That is, for example, if the current i flows through the winding L1, the current i' flows through the other winding L2, and vice versa. It should be noted that in a bifilar-wound configuration, the sign before the mutual inductance term M is negative.

Thus, equations (1) and (2) can be respectively rewritten as equations (5) and (6) as shown below:

$$v_s = LP1 \frac{di_1}{dt} + \left( L1 \frac{di_1}{dt} - M \frac{di_2}{dt} \right) + v_o \tag{5}$$

$$v_s = LP2 \frac{di_2}{dt} + \left( L2 \frac{di_2}{dt} - M \frac{di_1}{dt} \right) + v_o \tag{6}$$

Combining equations (5) and (6) together, the following equation which basically mathematically illustrates the self-regulating feature of the power distributing circuit 20 is obtained:

$$\frac{\frac{di_1}{dt}}{\frac{di_2}{dt}} = \frac{(LP1 + L1 + M)}{(LP2 + L2 + M)} \tag{7}$$

Thus, any change of the first current $di_1/dt$ must track with the corresponding change of the second current $di_2/dt$ in accordance with the ratio (LP1+L1+M)/(LP2+L2+M). The parameters LP1, LP2, L1, L2 and M are inductance values which can be predetermined and preset in advance. Thus, by manipulating these parameters, the current can be proportionally allocated through the two circuits 22' and 42' within the entire circuit 20'. In the special situation that the inductance values LP1 and LP2 of the inductors in the first and second circuits 22' and 42' are the same. Further, the inductance values L1 and L2 of the first and second windings of the regulating circuit 62 are the same. In that case, the ratio (LP1+L1+M)/(LP2+L2+M) is unity. Then, any change of the first current $di_1/dt$ must equal to the corresponding change of the second current $di_2/dt$, and vice versa. Thus, the concern of current overload in one circuit, such as the circuit 42, in comparison to the other circuit, such as the circuit 22, is basically eliminated.

A qualitative exemplary description can best summarize the operation of the stripped down circuit 20' shown in FIG. 7. For instance, due to unknown reasons, there is a sudden surge of current $di_1/dt$ in the first circuit 22'. As explained above, the increase in current $di_1/dt$ in the first circuit 22' is met with a corresponding increase in current $di_2/dt$ in the second circuit 42'. All the current increases go nowhere but channel to the load 34. As a result, there is an increase in the load voltage $v_o$. Since the supply voltage $v_s$ is preset and fixed, under Kirchhoff's law, to compensate for the increase in the load voltage $v_o$, the voltage $V_{LP1}$ across the inductor LP1 must decrease. From equation (3), change of current $di_1/dt$ through the inductor LP1 must also decrease. As a consequence, the first current $i_1$ passing through the entire first circuit 22' must accordingly decrease. The decrease of current $di_1/dt$ through the first circuit 22' must track with the corresponding decrease of current $di_2/dt$ through the second circuit 42' in accordance with the equation (7). Consequently, both the current $i_1$ through the first circuit 22' and the current $i_2$ through the second circuit 42' must decrease in tandem steps with each other until the two currents $i_1$ and $i_2$ are equal and reach the point of equilibrium.

Reference is now directed back to FIG. 3 in which the power factor correction circuits 32 and 52, and the PWM control circuit 74 are included for illustration. An alternating current (AC) passing through an electrical load is not always in phase with the driving voltage. In the design of a power distributing and delivery circuit, one main objective is to channel as much driving power to the load as possible, with minimal loss in the transmission process. Differently put, in the design of a power delivery circuit, one of the paramount goal is to maintain the "power factor" close to unity. The power factor of a AC circuit is in essence the cosine of the phase angle between the driving voltage and current.

The operation of the power distributing circuit 20 can best be explained with reference to FIG. 3 in conjunction with FIG. 8. In the following description, numerical examples are used. It should be noted that the numerical values are used for the purpose of illustration and are by no means limiting.

Suppose each outlet 38 or 40 has a current limit of 16 A which cannot be exceeded, as mandated by the NFTA. Further suppose that the load 34 consumes power at the rate of 3 KW.

The outlet 38 supplies a sinusoidal waveform. After rectification through the rectifier 30, as is well known in the art, the waveform at the output of the rectifier 30 which is also the input of the PWM control circuit 74 is a half-rectified sinusoidal wave as shown in FIG. 8 and is signified by the reference numeral 76.

Focus is first directed to the first circuit 22, which is coupled to the PWM control circuit that comprises a comparator 89 having two inputs 89A and 89B. Tied to one input 89B of the comparator 89 is the output of a multiplier 88. The multiplier 88 also has two inputs 88A and 88B. One input 88B of the multiplier 88 is driven by an error amplifier 85 which in turn has inputs 85A and 85B.

Assume at the beginning the FET switch S1 is turned on. Thus, the cathode of the diode D1 is at a higher potential than the corresponding potential at the anode. As a result, the diode D1 is reverse-biased and is turned off. The capacitor C, with initially stored energy, now discharges through the load 34. The discharge waveform of the output voltage $v_o$ is shown as waveform 86 from time interval of t=0 to t=t1 as shown in FIG. 8.

To control and maintain the DC voltage across the capacitor C at a desired constant value, the voltage level at the output node 58 needs to be fed back to the PWM control circuit 74 for processing. In particular, the first terminal 58 of the load 34 is routed to one of the inputs 85B of the error amplifier 85 in the PWM control circit 74. The other input 85A of the error amplifier 85 is connected to a reference voltage Vref. The difference between the voltage levels at the inputs 85A and 85B is amplified and sent to the input 88B of the multiplier 88. While the other input 88A of the multiplier 88 is tied to the output node 72B of the rectifier 30 via a buffer 98. The resultant signal at the output of the multiplier 88 is basically the multiplication product of the error-compared signal at the node 88B and the half-wave rectified signal at the node 88A. The resultant signal generated out of the multiplier 88 at the node 89B is shown in FIG. 8 as waveform 102.

Utilizing the signal feedback from the node 58 and thereafter generates the waveform 102 as described above serves two purposes, namely, to align the input current at the nodes 24A and 24B to be in-phase with the input voltage, and to maintain the output voltage at the output nodes 58 and 60 at a desired constant level. The dual purpose is accomplished by comparing the signal waveform 102 at the input node 89B of the comparator 89, with a sampling signal extracted from a sense resistor RS which is disposed between the output terminal 72A of the rectifier 30 and the second output terminal 60 of the load 34, as shown in FIG. 3. The sampling signal is shown as waveform 94 in FIG. 8 at the node 72A which is also the other input node 89A of the comparator 89. The sampling signal 94 essentially acts as an adjustable current reference. Once the voltage level at the input 89B of the comparator 89 exceeds the corresponding voltage level at the input node 89A, the comparator 89 switches. Likewise, the comparator 89 also switches but to the other direction when the voltage level at the input 89B is below the corresponding level of the node 89A. As a result, the output of the comparator 89 is a series of square wave pulse train at the output node 106 and is signified by the reference numeral 108 in FIG. 8.

Figure 8:
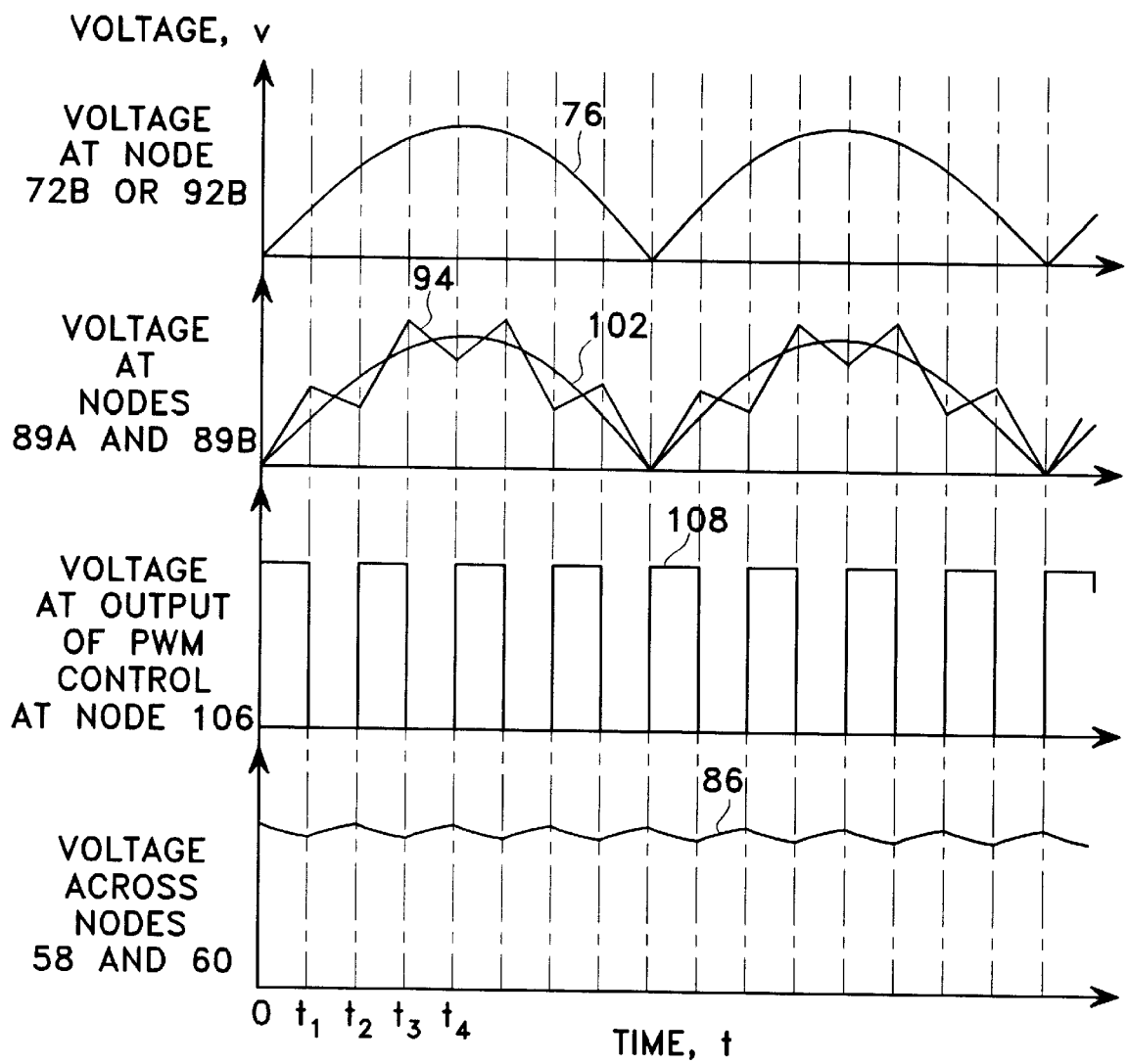
FIG. 8 is a timing diagram showing the various waveforms of the circuit shown in FIG. 3 during normal operation.

The action of the PMW control circuit 74 can also be understood by referring to the superimposed waveforms 94 at one input 89A of the comparator 89 and the waveform 102 at the other input 89B of the comparator 89 as shown in FIG. 8. From time t=0 to t=t1, the voltage level of waveform 102 falls below the reference waveform 94, the output of the comparator 89 responds with a high pulse. In a similar manner, from the time t=t1 to t=t2, the voltage level of waveform 102 exceeds the corresponding level of the waveform 94, the output of the comparator 89 responds with a low pulse.

From time t=t1 to t=t2, the FET switch S1 is turned off and acts as an open circuit. The potential at the anode of the diode D1 is higher than the corresponding potential at the cathode. As a consequence, the diode D1 is turned on. Current charges into the capacitor C through the diode D1. The output voltage $v_o$ across the load 34 at the node 58 is as shown in FIG. 8 as waveform 86 from time t=t1 to t=t2.

Accordingly, by comparing the sampled current signal waveform 94 from the sense resistor RS with the half-rectified waveform 102 which substantially resembles the input voltage that varies in amplitude with time, the input current is basically forced to follow both the amplitude and phase of the input voltage. At the same time, the output DC level, shown as waveform 108 in FIG. 8, available at the output nodes 58 and 60 of the circuit 20 is adjustable by manipulating the voltage level Vref at the node 85A.

The operation of the second circuit 42 is substantially similar to that of the first circuit 22 and is thus not further repeated. It should be noted that the two circuits share the same PWM control circuit 74. The PWM control circuit 74 along with the FET switch S1 or S2 have been integrated as one integrated circuit module by Unitrode Corporation of Merrimack, New Hampshire, under the part number UC2854.

As an alternative, each circuit 22 or 42 can has its own PWM control circuit 74. In such an arrangement, a high power factor can still be accomplished if the voltage waveforms at the outlets 38 and 44 are guaranteed to be in-phase.

Whenever there is any change of current level in one circuit exceeding or falling below the current level of the other circuit, the regulating circuit 62 will be triggered into action and perform the automatic adjustment as previously explained. Thus, the current levels through the two circuits 22 and 42 are always balanced, with no fear of one circuit operating in excess of current over the other circuit.

Figure 9:
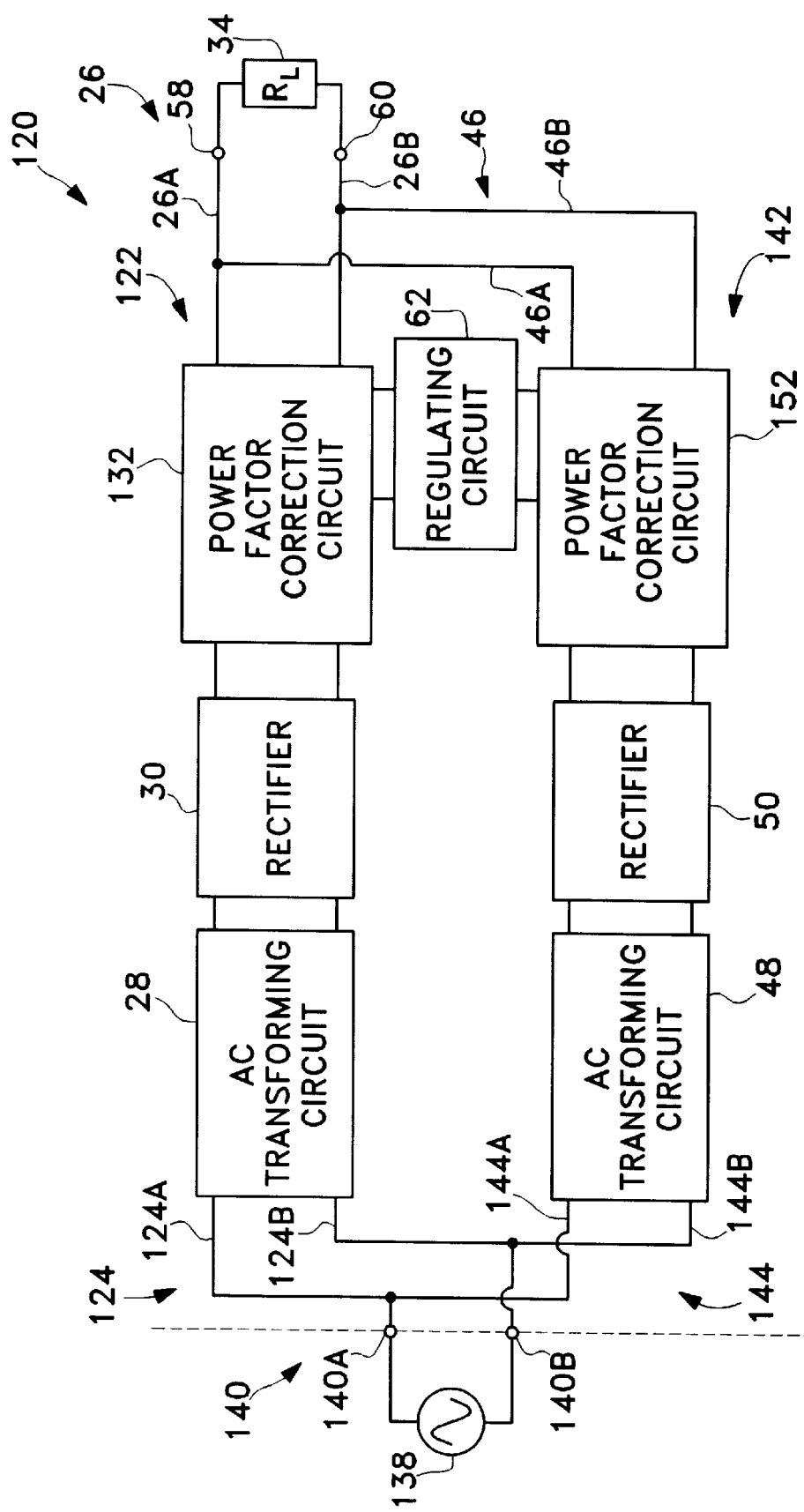
FIG. 9 is a schematic drawing showing the general architecture of a second embodiment of the invention.
Figure 10:
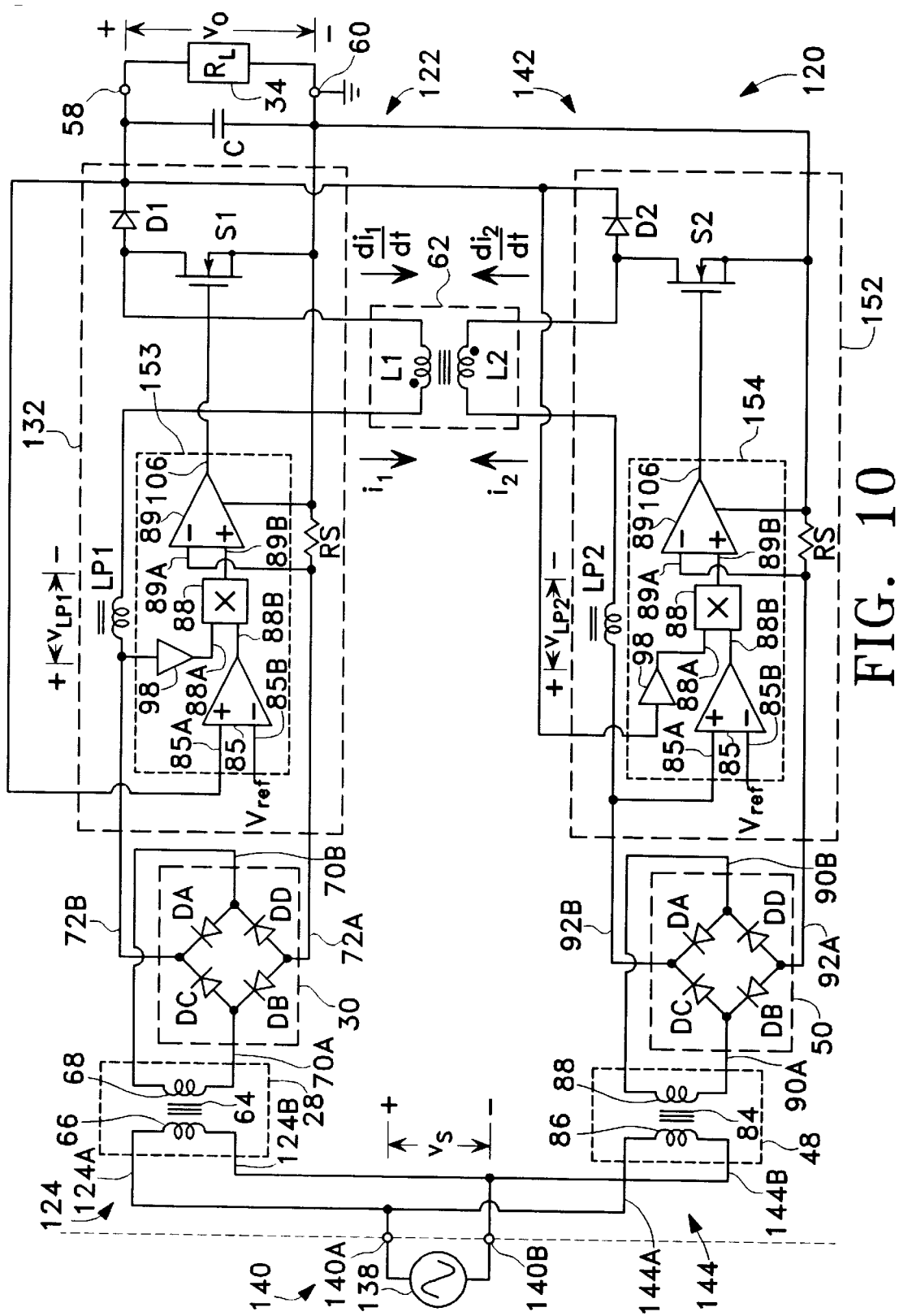
FIG. 10 is a schematic drawing highlighting the key circuits of the second embodiment of the invention.

FIGS. 9 and 10 show another embodiment of the invention signified by the reference numeral 120. FIG. 9 is a general architectural design of the power distributing circuit 120 and FIG. 10 is a schematic drawing with implementations highlighting the key circuits. As with the previous embodiment, the power distributing circuit 120 of this embodiment includes a first circuit 122 and a second circuit 142. However, instead of withdrawing power from a plurality of power outlets as in the previous embodiment, the circuit 120 of this embodiment extracts power from a single outlet 138. Specifically, the first circuit 122 has an input 124 which includes input terminals 124A and 124B. Likewise, the second circuit 142 has another input 144 which comprises input terminals 144A and 144B. The input terminals 124A and 144A of the first and second circuits 122 and 142, respectively, are tied together to the first output terminal 140A of the power outlet 138. In similar manner, the input terminals 124B and 144B of the first and second circuits 122 and 142, respectively, are connected together to the second output terminal 140B of the power outlet 138.

For each of the circuits 122 and 142, the arrangement is substantially similar to the corresponding circuits 22 and 42 of the previous embodiment. As with the previous embodiment, the first and second circuits 122 and 142 share a regulating circuit 62. However, in this embodiment, each circuit 122 or 142 has its own pulse width control circuit.

Reference is now directed to FIG. 10 which shows that, for example, the first circuit 122 has a first control circuit 153 incorporated into a power factor correction circuit 132. The electrical connections of first control circuit 153 with respect to the other circuits are substantially similar to that of the previous embodiment and need not further be elaborated. In a similar manner, the second circuit 142 has a second control circuit 154 implemented inside a power factor correction circuit 152.

The configuration of the power distributing circuit 120 of this embodiment provides operational redundancy for improved reliability. It is often said that the reliability of a circuit is as reliable as the weakest component of the entire circuit. For instance, in the first circuit 122 standing alone without the coupled second circuit 142 as shown in FIGS. 9 and 10, if any of the components fails, depending on the degree of failure, the entire first circuit 122 may be rendered malfunctioning. As a consequences, the load 34 may be suddenly cutoff of any power. Likewise, the same scenario may also apply to the second circuit 142. The power distributing circuit 120 arranged in accordance with the invention as shown in FIGS. 9 and 10 significantly reduces such power cut-off failure as herein explained.

Again, for purpose of description and by no means interpreted as limiting, numerical values are used. This time, the load 34 consumes power in the amount of 1 KW, which is below the wattage limit imposed on the outlet 138.

Suppose there is failure in the first circuit 122. The failure may be caused by a component defect, or it may be caused by a imperfect electrical connection, for example. Further suppose the failure is gradual and it occurs within a finite time period. Thus, there will be a change of current $di_1/dt$, assuming it is a decrease of current with respect to time, through the first winding L1 of the regulating circuit 62. As explained before, such change of current $di_1/dt$ is equally met with the corresponding change of current $di_2/dt$ in the second winding L2 until the currents $i_1$ and $i_2$ in both the circuits 122 and 142 are balanced. When the gradual failure matures into a sudden failure, there is no change of current in the first winding L1. As a consequence, the value $di_1/dt$ suddenly changes to and remains at zero. In that event, the second winding L2 reacts with an equal sudden change and with $di_2/dt$ drops down to zero thereafter. Relatively deprived of current, the load voltage $v_o$ across the load 34 decreases. Since the supply voltage $v_s$ is preset and fixed, in accordance with Kirchhoff's law, the voltage $v_{LP2}$ across the second inductor LP2 must increase to compensate for the decrease in load voltage $v_o$. From equation (3), change of current $di_2/dt$ through the inductor LP2 must also increase. Thus, current $i_2$ passing through the second circuit 142 must accordingly increase. The increase in current $i_2$ in the circuit 142 must continue until the demand of the load 34 is met. Since the first circuit 122 is assumed to be malfunctioning, the first winding L1 of the regulating circuit 62 can no longer be provoked into action. The second winding L2 in the regulating circuit 62 acts as if it is another inductor connected in series with the second inductor LP2. As a consequence, the second circuit carries the duty of distributing the entire power demand to the load 34. Thus, the power distributing function originally intended to be shared between both the circuits 122 and 142 is smoothly transferred to the second circuit 142 with no disastrous failure as a consequence.

Finally, other changes are possible within the scope of the invention. For all the embodiments as described, each power distributing circuit is depicted as coupling two circuits together. It should be noted that the level of coupling can be more than two. It is conceivable that multiple circuits can be coupled together for additional power sharing in the first embodiment, or for extra safeguard in the second embodiment. As mentioned before, the power distributing circuit in accordance with the invention do not limit themselves to be operable at the voltage and current levels as described. The voltage and current levels can assume various different ranges. Furthermore, the winding turns of the windings inside the regulating circuit need not be the same. As previously explained, the number of winding turns can well be different such that current flows into the circuits proportionally. It will be understood by those skilled in the art that these and other changes in form and detail may be made therein without departing from the scope and spirit of the invention.

What is claimed is:

1. A power distributing circuit for distributing power from a plurality of power sources, comprising:
   a first circuit electrically coupled to one of said power sources, said first circuit includes a first power factor correction circuit;
   a second circuit electrically coupled to another of said power sources, said second circuit includes a second power factor correction circuit; and
   a regulating circuit electrically coupled to said first and second circuits, said regulating circuit includes first and second windings, said first winding being bifilar-wound with respect to said second winding;
   wherein said first and second windings being respectively electrically coupled to said first and second power factor correction circuits, said first and second circuits further including respectively first and second outputs commonly driving a load.

2. The power distributing circuit as set forth in claim 1 wherein said first and second power factor correction circuits respectively include first and second inductors which are respectively electrically coupled to first and second windings.

3. The power distributing circuit as set forth in claim 2 further including a control circuit electrically coupled between said first and second power factor correction circuits.

* * * * *